United States Patent
McDonnell et al.

(10) Patent No.: US 9,272,568 B2
(45) Date of Patent: Mar. 1, 2016

(54) METHOD AND DEVICE FOR PRODUCING REGISTERED HOLOGRAPHIC MICROSTRUCTURE REFRACTIVE AND REFLECTIVE EFFECTS

(76) Inventors: Ryan McDonnell, Chadds Ford, PA (US); Clarence Miller, Paris (CA); Eric Wu, Taipei (TW); Richard Lavosky, Clarksville, TN (US)

(*) Notice: Subject to any disclaimer, the term of this patent is extended or adjusted under 35 U.S.C. 154(b) by 0 days.

(21) Appl. No.: 12/353,483

(22) Filed: Jan. 14, 2009
(Under 37 CFR 1.47)

(65) Prior Publication Data
US 2010/0276076 A1    Nov. 4, 2010

Related U.S. Application Data

(63) Continuation-in-part of application No. 11/087,640, filed on Mar. 24, 2005, now abandoned, and a continuation of application No. 12/125,631, filed on May 22, 2008, now Pat. No. 7,887,722.

(51) Int. Cl.
*B41M 3/12* (2006.01)
*B44C 3/02* (2006.01)
*G03H 1/02* (2006.01)

(52) U.S. Cl.
CPC .. *B44C 3/02* (2013.01); *G03H 1/02* (2013.01); *G03H 1/0252* (2013.01); *G03H 2227/04* (2013.01); *G03H 2250/10* (2013.01); *G03H 2270/23* (2013.01); *G03H 2270/31* (2013.01)

(58) Field of Classification Search
CPC ........ B44C 3/02; G03H 1/02; G03H 2270/31; G03H 2250/10; G03H 2270/23; G03H 2227/04; G05H 1/0252
USPC ........ 156/229, 247, 290, 84; 427/7; 264/1.34, 264/1.36, 1.38, 2.7, 2.5, 1.6, 1.7; 425/808
See application file for complete search history.

(56) References Cited

U.S. PATENT DOCUMENTS

| | | | |
|---|---|---|---|
| 6,616,887 B2 * | 9/2003 | Chiu et al. | 264/496 |
| 7,887,722 B1 * | 2/2011 | Wu | 264/1.34 |
| 2006/0213610 A1 * | 9/2006 | McDonnell et al. | 156/275.5 |

* cited by examiner

*Primary Examiner* — Michael N Orlando
*Assistant Examiner* — Margaret Squalls
(74) *Attorney, Agent, or Firm* — W. Edward Ramage; Baker Donelson

(57) ABSTRACT

An apparatus and method for preparing a flexible substrate with uniformly spaced images and corresponding physical or virtual registration marks at regular intervals, applying an energy curable coating to the flexible substrate either uniformly or in selected spots, and providing a master web carrying uniformly spaced impressing images and corresponding registration marks at regular intervals, where accurate alignment of the registration marks of the flexible substrate and the master web is achieved by stretching the master web to align the registration marks. One embodiment of the apparatus comprises scanners which sense the location of the registration marks on the flexible substrate and the master web; an electronic register control system programmed to monitor error signals representing the on-the-fly deviation in the alignment of the master and flexible substrate registration marks and makes determinations of the amount of stretching that must be applied to the master web in order to bring the registration marks into alignment; and means for achieving the appropriate stretching of the master web to produce the desired alignment.

17 Claims, 9 Drawing Sheets

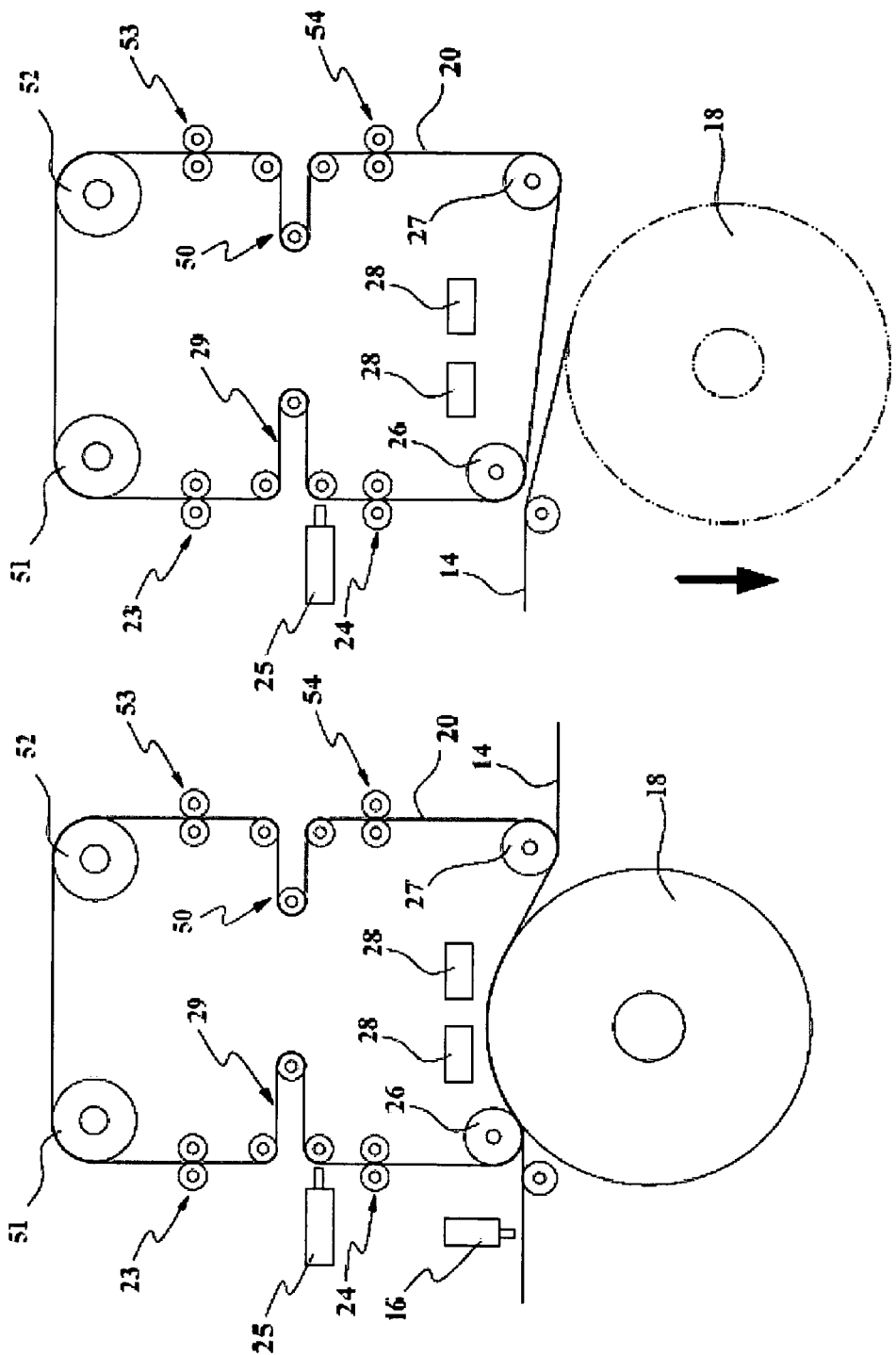

METHOD AND DEVICE FOR PRODUCING REGISTERED HOLOGRAPHIC MICROSTRUCTURE REFRACTIVE AND REFLECTIVE EFFECTS

This application is a continuation-in-part of U.S. application Ser. No. 11/087,640, filed Mar. 24, 2005 now abandoned, and is entitled to that priority date, in whole or in part, for priority. This application also is a continuation of U.S. application Ser. No. 12/125,631, filed May 22, 2008, now issued as U.S. Pat. No. 7,887,722, on Feb. 15, 2011, and is entitled to that priority date, in whole or in part, for priority. The complete disclosure, specification, drawings and attachments of U.S. application Ser. No. 11/087,640 are incorporated herein in their entireties by reference.

FIELD OF INVENTION

The present invention relates to a method and device for creating holographic, microstructure, refractive or reflective images on flexible graphic arts, and converting or packaging substrates. More particularly, the present invention relates to a method of impressing such images from a master film into an energy-curable coating on a flexible substrate in a predetermined registration with one or more printed images on the substrate.

BACKGROUND OF INVENTION

Coatings are used extensively by the graphic arts printing industry to protect and enhance products. The graphic arts printing industry and its packaging segment commonly apply coatings and other finishes to aesthetically and protectively improve printed materials and substrates, including business cards, catalogues, brochures, posters, publication covers, folding cartons, blister cards, shrink wrap films, and labels. Merchandisers are seeking a product that appeals to the consumer with a unique design and graphic appearance that differentiates their product from the rest.

Holographic, microstructure or refractive images, and other surface finishing techniques, are widely used in a variety of decorative and security applications, including throughout the graphic arts and converted industries to create flexible substrates and materials with a unique and distinctive look. Holographic and other microstructure or refractive images are applied to printed material to capture the visual attention of the viewer by producing elaborate visual effects via light refraction and reflection. Such applied imagery can produce different viewing effects depending on the viewing angle, light source, and image details. Additionally, holograms and other microstructure imagery are often used to authenticate the genuineness of a product and increase the difficulty of counterfeiting.

Due to the mechanical application techniques involved, all graphic arts coatings and finishes, including mirror, textured, and holographic finishes, are apt to vary in the quality of the finished product. Oftentimes, in order to perform such coatings and finishes, a printed substrate must be removed from the printing press where the ink was applied and placed in separate machines that perform the duties of coating, ultraviolet curing, and the like. This results in a variation in appearance and an inconsistent look being presented to the purchasing consumer, who is attracted to the sales appeal of an aesthetically appealing finished printed product.

The predominant method of applying holograms to flexible substrates has been the lamination of an embossed holographic film such as PET (polyethylene terephthalate) or BOPP (biaxially oriented polypropylene) to the substrate. This method provided a decorative effect and served as a deterrent to counterfeiting; however, it consumed additional raw materials, it prevented the recycling of paper and paperboard substrates, and it increased manufacturing costs.

An alternative method for applying holographic and other microstructure images used heating, as disclosed in U.S. Pat. No. 5,155,604, and while eliminating the need for lamination, it created other important drawbacks. For example, applying holograms to rigid resin substrates with a heated cylinder to form microstructure images in a hardened resin substrate can produce image distortion because of the substantial heat and pressure required to impress the image into the rigid substrate. Similarly, applying further heating to previously heat-impressed films, such as the heat necessary to apply shrink film webs with microstructure images to container surfaces, can distort the images, effectively causing them to disappear or to lose some of their holographic or other refractive properties. Moreover, many graphic arts, converting, and packaging substrates are heat sensitive, and exposure to temperatures at or above 30° C. would damage or destroy the substrate.

A method employed in the prior art for casting holograms or other images in registration with printing on a substrate uses a holographic or other image embedded in a cylinder or film; consequently, it can transfer shim lines or other unwanted patterns to the finished product. For example, electroformed metal masters may be welded together or plastic masters may be ultrasonically butt-welded, or a number of masters may be adhered to the surface of the cylinder with the impressing surfaces of the masters facing out. In each case seams are present which can be impressed onto the receiving substrate along with the intended imagery.

Systems for impressing holographic and other microstructure or refractive images into a layer of curable liquid resin using cylinders with adjacent relief image masters (as described above) and then curing are also known. These systems suffer shortcomings in addition to those stemming from the seams between adjacent masters on the cylinder. For example, it is difficult to maintain accurate registration between the impressing image on the cylinder and printing on the substrate carrying the curable liquid resin. This problem is exacerbated when the system is run at high speed. Indeed, current systems for impressing holographic and other microstructure or refractive images into a layer of curable liquid resin using cylinders with adjacent relief image masters offer no means for fine tuning the alignment between the impressing image on the cylinder and printing on the substrate carrying the curable liquid resin.

As manufacturers have increased their use of holography and diffractive patterns to improve security, counterfeiters have responded by developing increasingly sophisticated counterfeiting methods. Counterfeiters may use an exposed cast surface image itself to create a duplicate master of a holographic, refractive, or diffractive effect.

Packaging professionals seek visual impact, functionality, recyclability and sustainability, and cost effectiveness. Visual impact drives shelf appeal; it improves market differentiation; and it improves packaging value added. Functionality is a requirement, for no matter how good a package or product looks, it must perform on the packaging line and on the shelf. Current environmental awareness increases the need for packages and products that are recyclable and sustainable. Last, a package or product must be affordable; consequently, the methods used to produce the package or product must be cost effective.

Accordingly, what is needed is an environmentally friendly, cost effective method or apparatus for creating holographic, microstructure, refractive and reflective images in registration on a substrate, which may eliminate repeat lines, reduce image distortion, and is compatible with temperature sensitive substrates. Further, there is a need for a method or apparatus that achieves accurate registration at high speed and accommodates large images.

SUMMARY OF INVENTION

In one exemplary embodiment, the method for applying a cast finish to a printed substrate includes the steps of sealing the ink on a printed surface of the printed substrate with a coating to form a coated surface, laminating a film onto the coated surface of the printed substrate, curing the coated surface of the printed substrate with ultraviolet lighting through the film, removing the film from the coated surface of the printed substrate, and moving the substrate to a stacking unit. If a spot effect is desired, the sealing step can be replaced with the step of spot sealing the ink on the printed surface of the printed substrate with a coating.

The film used to create the finish on the substrate may be a transparent film. However, the finish can be altered by changing or altering the film itself. If an embossed effect is desired, a film with an embossed design can be used. Likewise, if a gloss effect is desired, a gloss film can be substituted. Also, if a holographic or reflective finish is desired, a holographic film or a film with a holographic image or design can be laminated onto the coated surface of the printed substrate.

In another embodiment, an apparatus or machine for performing the steps of the method for applying a cast finish to a printed substrate includes a coating unit for sealing the ink on the printed surface of the printed substrate with a coating to form a coated surface; a laminating unit for laminating the printed substrate with the film; a film handling unit for retaining, unwinding, and rewinding a roll of film; a series of ultraviolet lights for curing the coated surface of the printed substrate with ultraviolet lighting; a stacking unit for retaining the printed substrate; and a series of belts and rollers for moving the printed substrate through the machine. The machine can be a roll-fed or sheet-fed type machine and is manufactured to attach to an existing printing or coating press such that the process all takes place inline.

The finish or finished image that is applied to the printed substrate can be varied by altering the appearance of the film itself. Thus, when the film is laminated against the coated surface of the printed substrate and cured with the ultraviolet light, the resulting finish or decorative image is cast by the film onto the printed substrate. Once the substrate is cured, the film may be peeled away, rewound, and used four more times on successive substrates.

Another exemplary embodiment employs a master web that can be any length desired, with repeating impressing images regularly spaced along the web. In yet another embodiment, the master web may be a continuous loop, adjustable for repeat length and with repeating impressing images regularly spaced along the web loop. In order to transfer the images from the master web at an impressing station, the surface of the web carrying the impressing images is nipped against the surface of a flexible substrate carrying printing overlaid with an energy curable coating that is either continuous across the web or selectively spot coated. After the impressed image is applied to the energy curable coating at this impressing station in registration with the printing on the flexible substrate, the resin is cured through the master web by UV lamps, electron beam, or other energy cure unit. Post cure, a stripping roller separates the master web from the flexible substrate, and the flexible substrate is delivered for additional processing or use as desired.

This embodiment of an energy curable coating impressing system may be used inline with conventional printing systems that apply printing to the flexible substrate ahead of the energy curable coating application and impressing steps. Alternatively, printing may be applied after the energy curable coating application/impressing steps, or both before and after the energy curable coating application/impressing steps. Also, the energy curable coating application/impressing system may be used in a standalone fashion where printing is applied to the flexible substrate web in a separate discrete step at a remote location. Additionally, printing may be applied to one or both sides of the flexible substrate, including optionally overprinting the energy curable coating after it is cured. As an anti-tampering method for certain security applications, a removable coating may be laid down over the energy curable coating in such an overprinting step to hide the microstructure image until access is required to establish the product's bona fides by wiping away the removable coating to reveal the microstructure image.

In one embodiment, the master web and the flexible substrate are both provided with registration marks that are aligned in accordance with the invention before the master web impressing image is nipped to the energy curable coating to ensure accurate registration between the impressed image in the energy curable coating and the printing on the flexible substrate. The registration marks may be any type of mark that is detectable by a register control scanner such as printed rectangles, triangles or other geometric shapes, cross hairs, or bulls eyes known to the art.

In another exemplary embodiment, there are no actual registration marks of the flexible substrate. Instead, virtual registration marks are created by monitoring the position of a print cylinder in an energy-curable coating station by means of an encoder known to the art and measuring and tracking the actual length of the flexible substrate fed through the energy-curable coating unit. This predetermined length must be determined in advance to allow for the fine tuning of either the master roll or the substrate web to prevent any accumulated difference and to ensure that a consistent repeat is maintained between the images on the substrate web and the impressing images on the master web.

In yet another embodiment, the master web and a sheet fed flexible substrate are both provided with registration marks that are aligned in accordance with the invention before the master web impressing image is nipped to the energy curable coating to ensure accurate registration between the impressed image in the energy curable coating and the printing on the flexible substrate. This may be accomplished with a unique fine-tuning step by varying the line speed of a conveying mechanism for a sheet fed flexible substrate.

In another exemplary embodiment, the invention accomplishes registration using unique iterative steps in which the images on the master web are spaced apart or have a "repeat" distance slightly less than the intended spacing (or "repeat") of the impressed images in coordination with the printed images on the flexible substrate so that the master web can be stretched on-the-fly, in increments or by varying amounts, to establish and then to maintain continuous registration of the impressed image and the printing on the flexible substrate. The on-the-fly stretching process relies on sensing the arrival of registration marks on the master web at a predetermined master web register scanner location chosen to correlate with the arrival of the registration marks on the flexible substrate at another predetermined substrate register control scanner location where simultaneous arrival of the registration marks of the master web and flexible substrates at these predetermined locations indicates proper registration of the impressed images and the printed images on the flexible substrate. Thus, when the registration marks on the master web arrive at the master web register scanner before the registration marks on the flexible substrate arrive at the substrate register control scanner, correction by on-the-fly variable stretching of the master web is carried out as described below. When there is no such image dislocation, no correction is applied. Also, since the practical stretching range of the master web is limited and varies depending on the material and thickness of the master web, where the image dislocation exceeds the practical stretching range of the master web, the image alignment typically will proceed in successive or iterative stretching steps until full alignment is achieved.

On-the-fly variable stretching is accomplished by running the master web through at least two powered nip stations where the master web speed nip station (the nearest to the impressing station) has a line speed corresponding to the line speed of the flexible substrate through the impressing station and the line speed of the master web tension nip station is decreased as necessary causing the master web to stretch between the two nip stations until the registration marks on the master and flexible substrates arrive at the nip point of the impression station simultaneously. The master and carrier registration mark arrivals are monitored by register control scanners at these locations that send the register mark data to an electronic register control system known to the art to control the line speed of the upstream nip pair as appropriate to achieve the necessary stretching of the master web. The stretching of the master web is thus continuously adjusted by the electronic register control system which receives and processes an error signal indicative of the extent to which the registration marks on the master and flexible substrates are out of alignment. This process may be facilitated by generally "pre-aligning" the images before start up so that the number of iterations of correction can be minimized.

In another embodiment, the on-the-fly variable stretching is applied to a web-fed flexible substrate using the stretching technique described above with respect to the master web to achieve an on-the-fly continuous registration between the impressed image and the printing on the flexible substrate. This is accomplished by adjusting the speed of a servo-controlled substrate web tension nip. The substrate web tension nip is continuously adjusted by an electronic register control system which receives and processes a signal indicative of the extent to which the registration marks on the master and substrate web are apart.

Accordingly, one embodiment of the present invention includes preparing a flexible substrate with uniformly spaced image registration marks at regular intervals. An energy-curable coating may be applied to the flexible substrate either uniformly or in selected spots ("spot coating"). Spot coating is preferred for shrink film flexible substrates where the amount of energy-curable coating is to be minimized since large amounts or broadly applied energy curable coating can produce distortions in the film when it is later shrunk, e.g., onto a container. A master web carrying a uniformly spaced impressing image and registration marks at regular intervals is supplied. Electron beam or UV curing energy is transmitted through the master web to cure or harden the energy curable coating; afterwards, the master web is separated from the flexible substrate to leave a cast image on the flexible substrate. The master web may typically be provided on a supply roll although it also may be in the form of a continuous belt. Where the master web is in the preferred form of a supply roll, it may be rewound and reused without reconditioning.

In a further exemplary embodiment, rapidly achieved and maintained accurate alignment of the registration marks of the flexible substrate and the master web is accomplished. This may be achieved by an apparatus including: (1) register scanners which sense the location of the registration marks on the flexible substrate and the master web; (2) an electronic register control system programmed to monitor error signals representing the on-the-fly deviation in the alignment of the master web and flexible substrate registration marks and makes determinations of the amount of stretching that must be applied to the master web in order to bring the registration marks into alignment; and (3) means for achieving the appropriate stretching to produce the desired alignment. Further, the stretching may be generally accomplished in increments that do not exceed the maximum acceptable elastic limits of the carrier film being used. For example, the elastic limit would be up to approximately 1.5%-3.0% for oriented polypropylene master web as a percent of length.

The flexible substrate and master webs can be any appropriate sufficiently flexible material. Preferably, in one embodiment the flexible substrate will have a thickness in the range of about 10-100 mil (0.254-2.54 mm). For example, the flexible substrate may be heat shrinkable film, polyethylene terephthalate, polypropylene, oriented polypropylene, polyvinyl chloride, polystyrene, amorphous polyethylene terephthalate, polyethylene, paper, metal foil, coiled metal. In another preferred embodiment the flexible substrate will be a heat shrinkable film. Appropriate heat shrinkable films include oriented polystyrene, glycol-modified polyethylene terephthalate, and polyvinyl chloride. For such heat shrinkable films, the film thickness will generally be in the range of about 30-80 microns.

The impressing image may be chosen to produce impressed images including, for example, holographic, varying texture images (e.g., matte film), stereograms, light-defracting devices, optical lenses, and lenticular surfaces.

The energy-curable coating may be any known flowable liquid energy-curable that can be rapidly cured by the application of ultra-violet radiation, electron beam, or other radiation curing method. For example, UV curable flowable liquid coatings may be used or coatings curable with electron beam radiation may be used. Examples of UV curable resins include, but are not limited to, UV curable overprint varnishes, free radical and cationic energy-curable coatings, and UV curable lithographic inks.

In one embodiment of the invention, the energy-curable coating will be curable with UV radiation and the master web will be sufficiently transparent or translucent to permit the UV radiation to pass through to cure the energy-curable coating.

In yet another exemplary embodiment, the master web comprises a cold foil film. An energy-curable coating will be applied to the flexible substrate either uniformly or in selected spots. Spot coating is used when a "foil stamp" reflective image is desired. UV curing energy is transmitted through the cold foil master web to cure a high adhesion energy curable coating such as Cork Industries' CU-1137HG-21VS. Suitable commercially available high adhesion energy curable coatings in this class are available, for example, from Cork Industries, 500 Kaiser Drive, Folcroft, Pa. 19032. The high adhesion energy curable coating strips metal from the cold foil in a wet lamination process known to the art. In another embodiment, an auxiliary energy cure unit is added between the coater and the master web nip. The coater applies an energy curable pressure sensitive coating to the flexible substrate either uniformly or in selected spots, the auxiliary energy cure unit activates the coating, the substrate is nipped to the cold foil master web, and the pressure sensitive energy curable coating strips metal from the cold foil in a dry lamination process known to the art. Afterwards, the master web is separated from the flexible substrate to leave a reflective metal image on the flexible substrate. The master web will typically be provided on a supply roll, and it may be rewound for reconditioning.

These and other features of the present invention will become readily apparent upon further review of the following specification and drawings.

BRIEF DESCRIPTION OF THE DRAWINGS

FIG. 8a is a diagrammatic representation of a system in accordance with an exemplary embodiment of the present invention in which the impression cylinder is moved downward for easier substrate web transporting, where the impression cylinder is in the up, or engaged, position.

FIG. 8b is a diagrammatic representation of the system of FIG. 8a where the impression cylinder is in the down, or disengaged, position.

FIG. 9b shows a cold foil reflective image made by the method of FIG. 9a.

DETAILED DESCRIPTION OF EXEMPLARY EMBODIMENTS

In one exemplary embodiment, the present invention comprises a method and device for applying a cast finish to a printed substrate. Finishes, including embossed, gloss, and holographic finishes, are used throughout the graphic arts printing industry to create printed materials with a unique and distinctive look. All graphic arts coatings and finishes, due to the mechanical application techniques involved, are apt to vary in the quality of the finished product. In one embodiment, the present invention offers a new method and apparatus by which the graphic arts printing industry may include finishes and decorative design images on common printed substrates, thereby providing a consistently high quality and visually aesthetic finished product.

Figure 1:
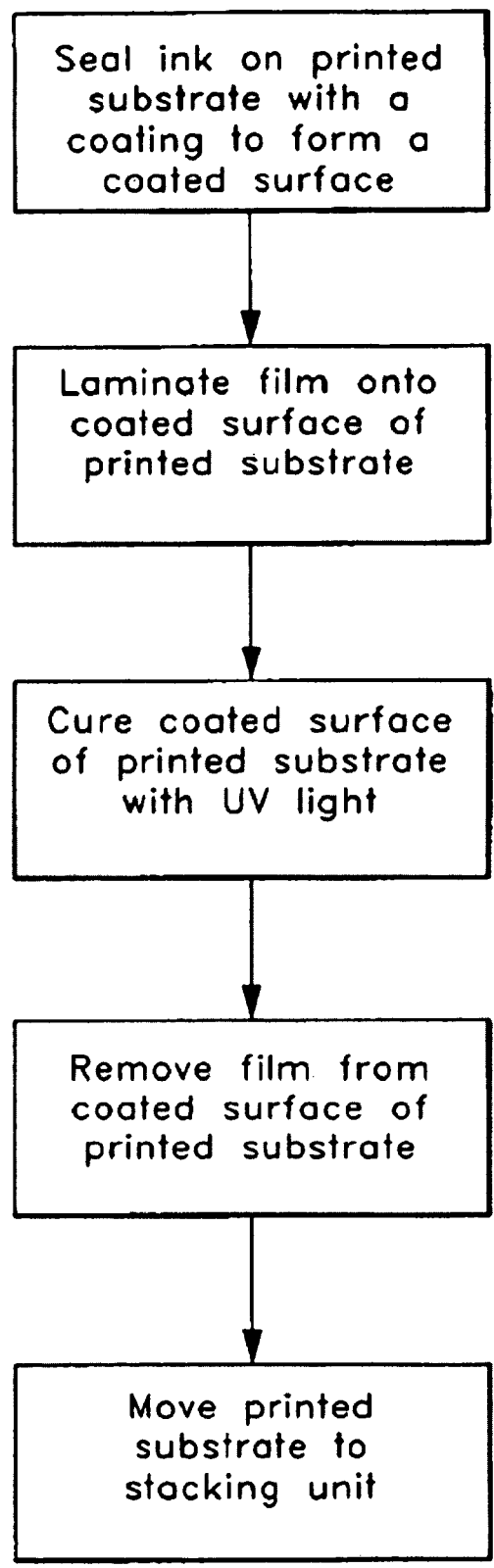
FIG. 1 is a flowchart showing the steps of a method for applying a cast finish to a printed substrate according to the present invention.

As shown in FIG. 1, in one embodiment the process begins by sealing the ink that has been printed onto a substrate with a coating process to form a coated surface. The coating process can include coating the printed substrate with a UV coating or any other radiation type coating process that is accepted in the industry. The printed substrate is a printed material that has completed the printing process in a standard printing press.

The next step involves laminating a film onto a coated surface of the printed substrate. The film is cast such that the entire printed surface of the substrate is covered by a layer of film. Depending on the desired finish, different films can be used, including transparent film, gloss film, holographic film, or any such film with an embossed design. Next, ultraviolet light is used to cure the coated surface of the printed substrate. The ultraviolet light is applied to the coated surface while the film is laminated on top of it, resulting in the desired finish or design image being fixed on the printed substrate. After the ultraviolet curing has been finished, the film is removed from the surface of the printed substrate and the finished substrate is moved to a stacking unit. The stacking unit is where all of the completed substrates are collected after the process has been applied.

Figure 2:
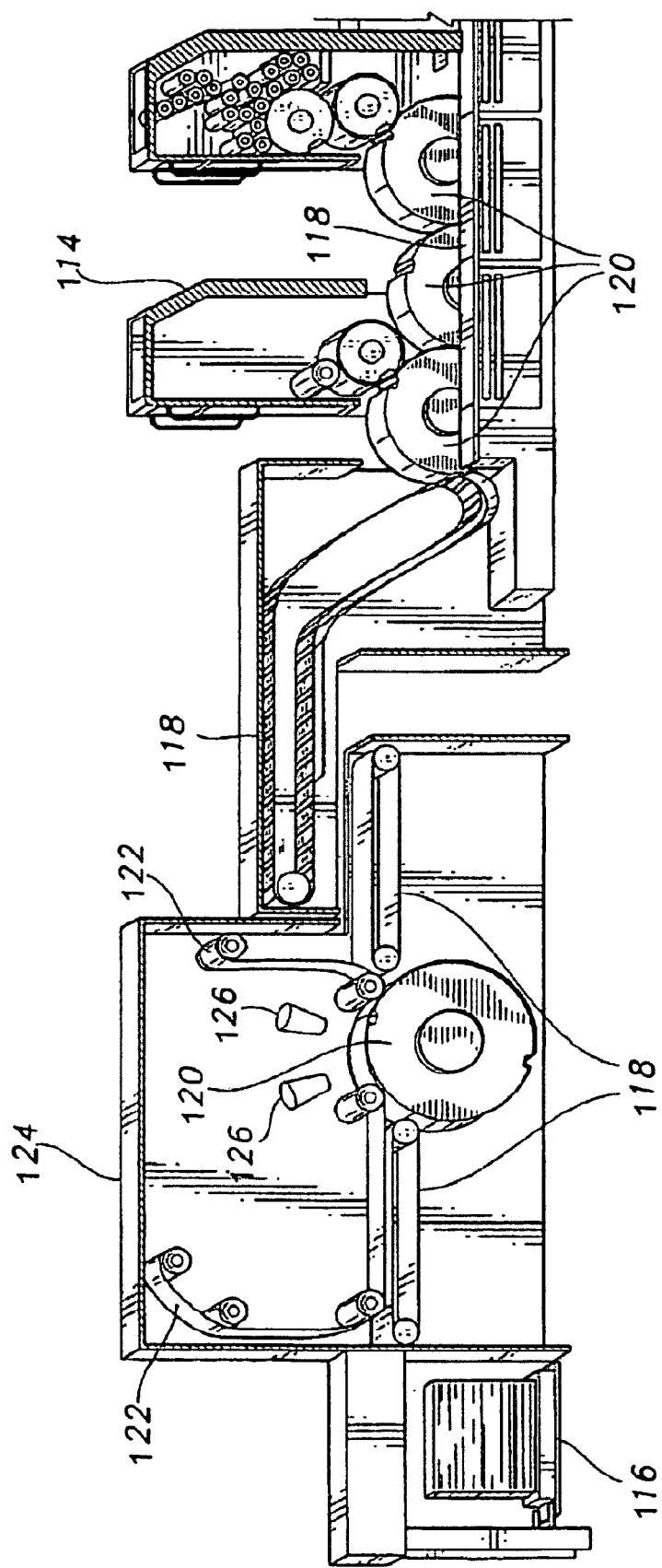
FIG. 2 is a side view, partially in section, of an embodiment of an apparatus for applying a cast finish to a printed substrate according to the present invention.

FIG. 2 shows an exemplary embodiment of an apparatus that may be used to carry out the method for applying a cast finish to a printed substrate. The apparatus is a machine that includes a coating unit 114 for sealing the ink on the printed surface of the printed substrate with a coating, a laminating unit 124 for laminating the printed substrate with the film, a film handling unit 122 for retaining, unwinding, and rewinding the film, a series of ultraviolet lamps 126 for curing the printed surface of the printed substrate with ultraviolet lighting, a stacking unit 116 for retaining the printed substrate, and a series of belts 118 and rollers 120 for moving the printed substrate through the machine. The machine is a roll-fed or sheet-fed type machine that is designed to be attached to a standard printing or coating press, allowing all of the steps of the present invention to occur inline with the printing process itself. The machine can be designed to retrofit any and all of the printing presses that are currently being used in the industry.

In one particular embodiment, the method described herein takes place at temperatures less than 40 degrees C. Further, no material is transferred from the film to the coating on the flexible substrate, whereby the film can be used multiple times without re-treating. In addition, in one embodiment, light pressure or no pressure is applied after the film is applied to the surface of the flexible substrate. It will be understood that the term "substrate" as used herein refers to plastic, paper, cardboard, metal, or any other flexible material utilized by those in the graphic arts printing industry.

Figure 3:
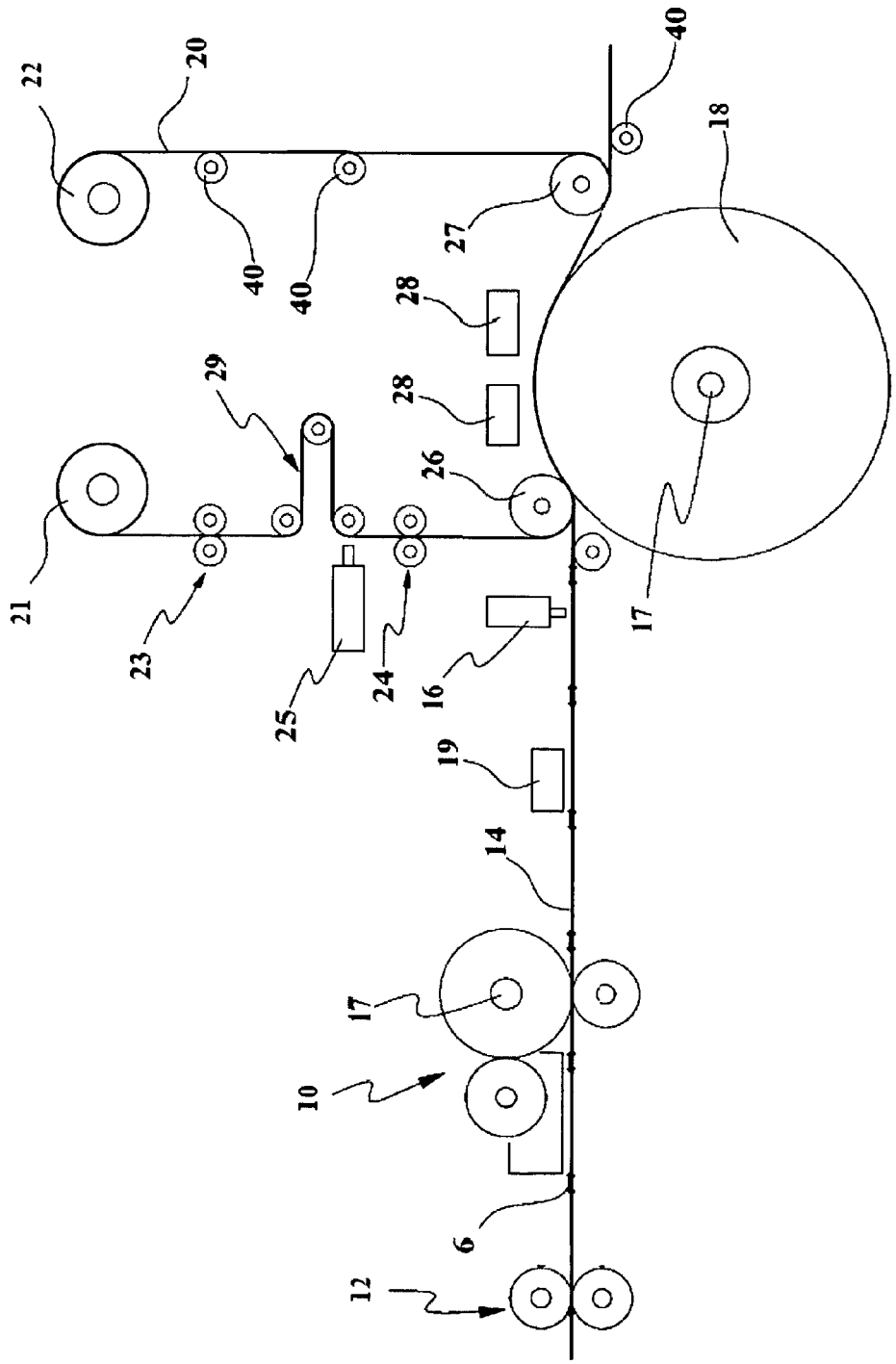
FIG. 3 is a diagrammatic representation of a system in accordance with an exemplary embodiment of the present invention in which registration between printed images on a web fed flexible substrate and impressed holographic and other microstructure or refractive images also on the flexible substrate is achieved.

FIG. 3 shows another embodiment of an apparatus for transferring holographic and other microstructure or refractive images onto a web-carried energy curable coating in registration with printing on the flexible substrate impressed is illustrated. The graphic arts or converting flexible substrate 14 may be any web-like material which is capable of being passed through a printing press-type apparatus. For example, the flexible substrate may be PET, polypropylene, oriented polypropylene, PVC, polystyrene, APET, polyethylene, coated and uncoated papers, foils, thin metal or coil, paperboard, or the like. One particularly desirable flexible substrate is heat-shrinkable film. Flexible substrate 14 in the illustrated embodiment is oriented polystyrene suitable for shrink wrap applications and includes flexible substrate registration marks 6 which are printed onto the web (and would not be thick enough to be apparent in the view of FIG. 3 but have been enlarged here in order to make them visible).

Flexible substrate 14 is advanced through a web tension control nip 12 to an energy curable coating station 10, and the coater applies a spot or full flood coat of an energy curable coating onto the surface of the flexible substrate web 14 using an appropriate coating apparatus and process. The energy curable coating station may be of any conventional design and may use, for example, gravure, flexographic, lithographic or silk screen techniques to apply the energy curable coating.

The energy curable coating may be any known flowable liquid resin that is rapidly curable by the application of actinic radiation, including particularly UV radiation, electron beam radiation, and LED light. Examples of classes of suitable energy curable coatings include UV curable overprint varnishes, free radical and cationic energy curable coatings, curable lithographic inks, and the like. Suitable commercially available energy curable coatings in these classes are available, for example, from Cork Industries, 500 Kaiser Drive, Folcroft, Pa. under the trademarks and product designations CORKURE™ CU-1170HG-38, CU-1170HG-49, CU-2038HG-25, CU-1164HG-14, and CU-1137HG-21VS.

The coated flexible substrate 14 is advanced past a substrate register control scanner 16 toward an impression cylinder 18 where it passes through a nip point formed by the powered impression cylinder 18 and an infeed nip roller 26. Alternatively, infeed nip roller 26 may be powered. The energy curable coating is impressed by impression images on a master web 20 at this point (as explained below), as the flexible substrate advances at a pre-determined line speed "x". As the energy curable-coated flexible substrate moves around the impression cylinder following the infeed nip roller 26, it passes under an energy cure unit 28 which will supply the radiation required to cure the coating through the master web to fix the microstructure images impressed in the surface of the resin coating, as also explained below. Thus, where the energy curable coating is a UV coating, the master web 20 will be clear or translucent to UV light, and energy cure unit 28 will comprise one or more UV lamps of a power sufficient to cure the resin coating as the flexible substrate moves rapidly past the lamp(s). Preferably the UV lamp(s) are located in a protective housing positioned close to the periphery of impression cylinder 18. After the flexible substrate carrying the cured coating exits the area below the radiation source, it is advanced between an outfeed stripping roller 27 and an idler roller 40. No external pressure is applied to the master web and the flexible substrate between the infeed nip roller 26 and the outfeed stripping roller 27. The flexible substrate is advanced for further processing or delivery (not shown) as desired.

Figure 5:
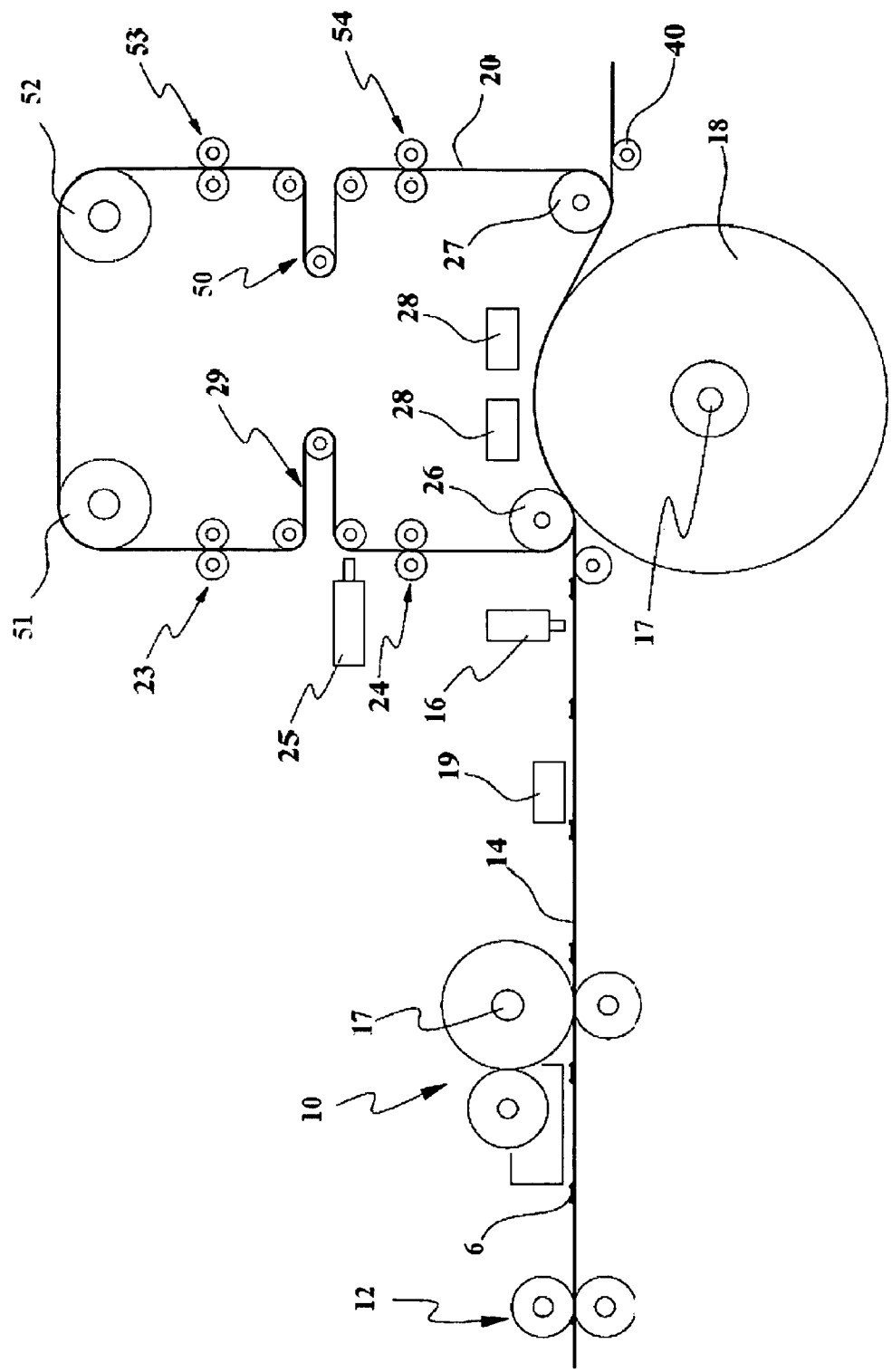
FIG. 5 is a diagrammatic representation of a system in accordance with an exemplary embodiment of the present invention in which registration between printed images on a web fed flexible substrate and impressed holographic and other microstructure or refractive images also on the flexible substrate is achieved by means of a continuous loop master web used in lieu of the master web shown in FIG. 3.

One embodiment of the invention is also supplied with a master web 20 carrying a pre-formed microstructure image. The image may comprise, for example, a uniformly spaced series of surface relief hologram impression images or other relief light diffraction impression images. These impression images may include, for example, holographic images, varying texture images (e.g., matte film), stereograms, light-defracting devices, optical lenses, and lenticular surfaces. The master web will typically be supplied from a master web unwind roll 21 as shown in FIG. 3, although alternatively it may be in a continuous belt form as shown in FIG. 5. The master web may include a series of master registration marks.

The master web is advanced from the master web unwind roll 21 to a master web rewind roll 22. The master web is drawn through a master web tension nip 23 at a first master line speed "y" which will be less than or equal to the flexible substrate line speed "x". The master web next enters and moves over an optional master web compensator section 29 and through a second powered master web speed nip 24 through which the master web 20 is next advanced at speed "x" which is equal to the flexible substrate line speed. Master web tension nip 23 is powered and operates at a controllable variable speed to cooperate with master web speed nip 24 in producing the desired degree of stretch in the master web, as explained below.

A master web register scanner 25 is positioned opposite the master web compensator section 29. This sensor is designed to determine when master web registration marks pass this location. The registration marks may be illuminated and imaged through an optical path and the image information from the detected beam continuously processed using an electronic register control system which generates an error signal dependent upon the displacement of master registration marks in relation to the flexible substrate registration marks. Additionally, edge scanners (not shown) can be used to ensure proper tracking of the master and flexible substrates.

The master web 20 then passes over infeed nip roller 26 and is thus nipped to the coated flexible substrate to impress microstructure on the master web into the surface of the energy curable coating on the flexible substrate. The energy curable coating and its impressed image are then cured by the energy cure unit(s) 28 to fix the image. After the master web passes and moves past the energy cure unit(s) 28, it travels over an outfeed stripping roller 27 to a powered rewind roll 22.

Images on the master web 20 are spaced at a repeat distance less than the intended repeat distance of the impressed images on the flexible substrate (corresponding to the similarly repeating printed images on the flexible substrate) so that the master web can be stretched as necessary to place the impressed images onto the flexible substrate in the proper alignment. The master web is stretched on-the-fly, in increments or by varying amounts, to establish and then to maintain continuous registration of the impressed image and the printing on the flexible substrate.

The on-the-fly stretching process relies on sensing the arrival of the registration marks on the master web associated with the impressing images at master web register scanner 25 which correlates with the arrival of the registration marks on the flexible substrate at flexible substrate register control scanner 16 where simultaneous arrival of the registration marks of the master and flexible substrates at these predetermined locations indicates proper registration of the impressed images and the printed images on the flexible substrate. Thus, when the registration marks on the master web arrive at the master web register scanner before the registration marks on the flexible substrate arrive at the flexible substrate sensor correction by on-the-fly variable stretching of the master web is carried out. This on-the-fly variable stretching is accomplished by running the master web through the powered master web tension nip 23 and the powered master web speed nip 24 where speed nip 24 runs at the line speed of the flexible substrate and the line speed of the tension nip 23 is decreased as necessary to stretch the master web between the two nip stations until the registration marks on the master and flexible substrates arrive at their predetermined master and flexible substrate sensor locations simultaneously.

The data regarding arrival of the registration marks at register control scanners 16 and 25 is sent to an electronic register control system common to modern printing technology (not shown). The electronic register control system is programmed using known techniques to control the line speed of the upstream nip pair as appropriate to achieve the necessary stretching of the master flexible substrate. The stretching of the master web is thus continuously adjusted by the electronic register control system which receives and processes an error signal indicative of the extent to which the registration marks on the master and flexible substrates are out of alignment. In one preferred embodiment, a master web compensator section 29 maintains web tension adjustments by removing any slack in the master web.

In another embodiment, images on the master web 20 are spaced at a repeat distance equal to the intended repeat distance of the impressed images on the flexible substrate (corresponding to the similarly repeating printed images on the flexible substrate) so that the master web speed can be advanced or retarded as necessary to place the impressed images onto the flexible substrate in the proper alignment. The master web speed is varied on-the-fly, in increments or by varying amounts, to establish and then to maintain continuous registration of the impressed image and the printing on the flexible substrate. The master web 20 registration process relies on sensing the arrival of the registration marks on the master web associated with the impressing images at master web register scanner 25 which correlates with the arrival of the registration marks on the flexible substrate at flexible substrate register control scanner 16 where simultaneous arrival of the registration marks of the master and flexible substrates at these predetermined locations indicates proper registration of the impressed images and the printed images on the flexible substrate. Thus, when the registration marks on the master web arrive at the master web register scanner before the registration marks on the flexible substrate arrive at the flexible substrate sensor correction by advancing the speed of the master web is carried out. This on-the-fly speed adjustment is accomplished by running the master web through the powered master web speed nip 24 where speed nip 24 speed is increased or decreased as necessary until the registration marks on the master and flexible substrates arrive at their predetermined master and flexible substrate sensor locations simultaneously.

In another embodiment of the invention, on-the-fly variable stretching of the flexible substrate is accomplished by running the flexible substrate 14 through a powered web tension control nip 12, and the line speed of the tension nip 12 is decreased as necessary to stretch the flexible substrate web between the tension nip 12 and the infeed nip 26 until the registration marks on the master and flexible substrates arrive at their predetermined master and flexible substrate sensor locations simultaneously.

Figure 4:
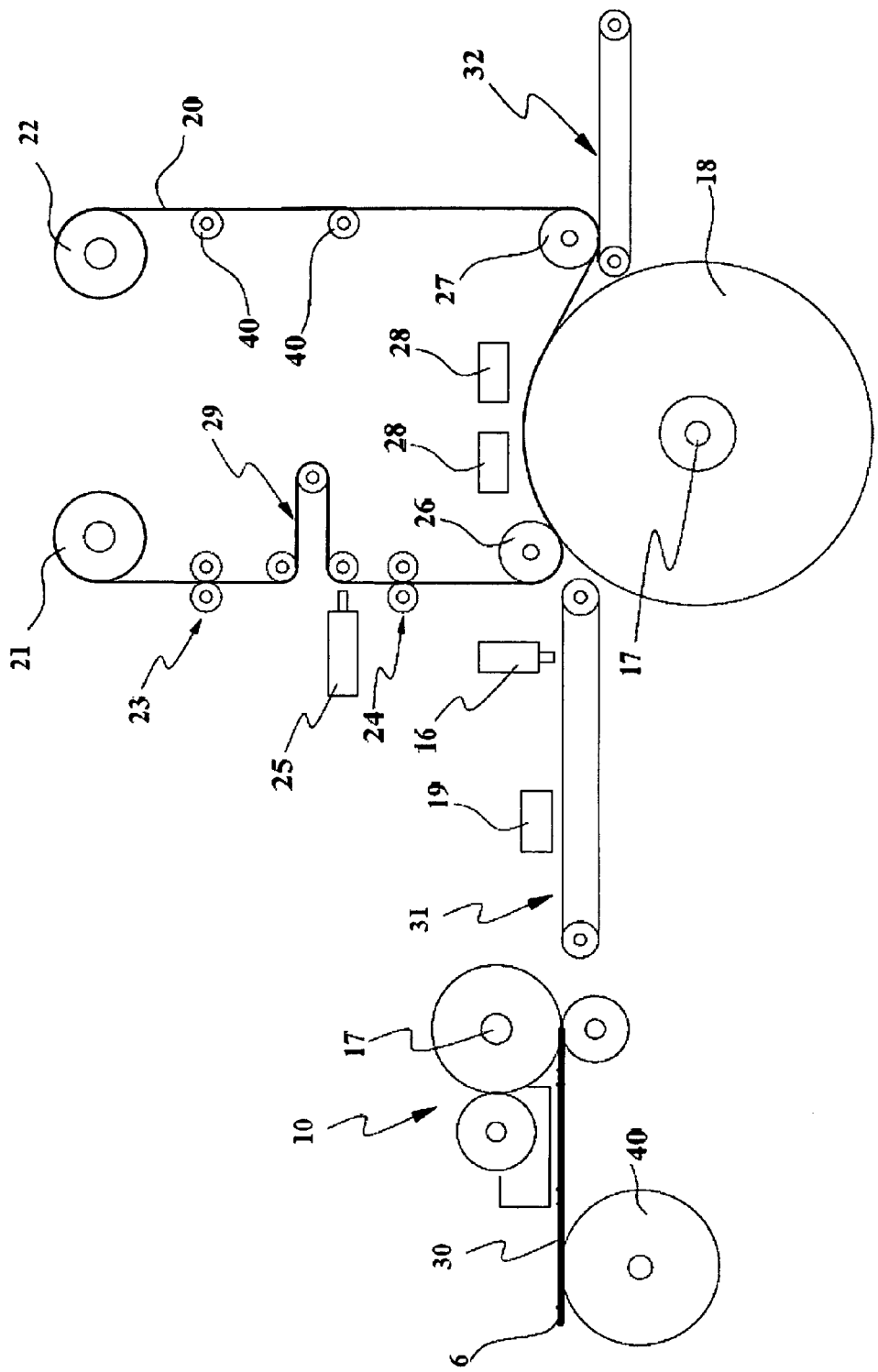
FIG. 4 is a diagrammatic representation of a system in accordance with an exemplary embodiment of the present invention in which registration between printed images on a sheet fed flexible substrate and impressed holographic and other microstructure or refractive images also on the flexible substrate is achieved.

FIG. 4 shows another embodiment of an apparatus for transferring holographic and other microstructure or refractive images onto a sheet-carried energy curable coating in registration with printing on the flexible substrate. The graphic arts or converting sheeted flexible substrate 30 may be any sheeted material which is capable of being passed through a printing press-type apparatus. One particularly desirable sheeted flexible substrate is folding carton paperboard. Sheeted flexible substrate 30 in the illustrated embodiment includes substrate registration marks 6 which are printed onto the sheeted substrate (and would not be thick enough to be apparent in the view of FIG. 4 but have been enlarged here in order to make them visible).

In one embodiment, images on the master web 20 are spaced at a repeat distance equal to the intended repeat distance of the impressed images on the sheeted flexible substrate 30 (corresponding to the similarly repeating printed images on the flexible substrate) so that the sheeted substrate speed can be advanced or retarded as necessary to place the impressed images onto the sheeted flexible substrate in the proper alignment. The sheeted substrate 30 speed is varied on-the-fly, in increments or by varying amounts, to establish and then to maintain continuous registration of the impressed image and the printing on the sheeted substrate. The master web 20 registration process relies on sensing the arrival of the registration marks on the master web associated with the impressing images at master web register scanner 25 which correlates with the arrival of the registration marks on the sheeted flexible substrate at flexible substrate register control scanner 16 where simultaneous arrival of the registration marks of the master and flexible substrates at these predetermined locations indicates proper registration of the impressed images and the printed images on the flexible substrate. Thus, when the registration marks on the master web arrive at the master web register scanner before the registration marks on the sheeted flexible substrate arrive at the flexible substrate sensor correction by advancing the speed of the sheets is carried out. This on-the-fly speed adjustment is accomplished by conveying the sheets with a powered infeed conveyor 31 where speed is increased or decreased as necessary until the registration marks on the master and flexible substrates arrive at their predetermined master and sheeted flexible substrate sensor locations simultaneously.

FIG. 5 shows another embodiment of an apparatus for transferring holographic and other microstructure or refractive images onto a web-carried energy curable coating in registration with printing on the flexible substrate impressed is illustrated. In this embodiment, a master web 20 will be in a continuous belt form. To accommodate a wide range of image repeat lengths, an impression length compensator unit 50 varies the master web path distance by increasing or decreasing the web path between compensator tension nip 54 and compensator speed nip 53. Web alignment rollers 51 and 52 respond to a master web edge guide (not shown).

Figure 6:
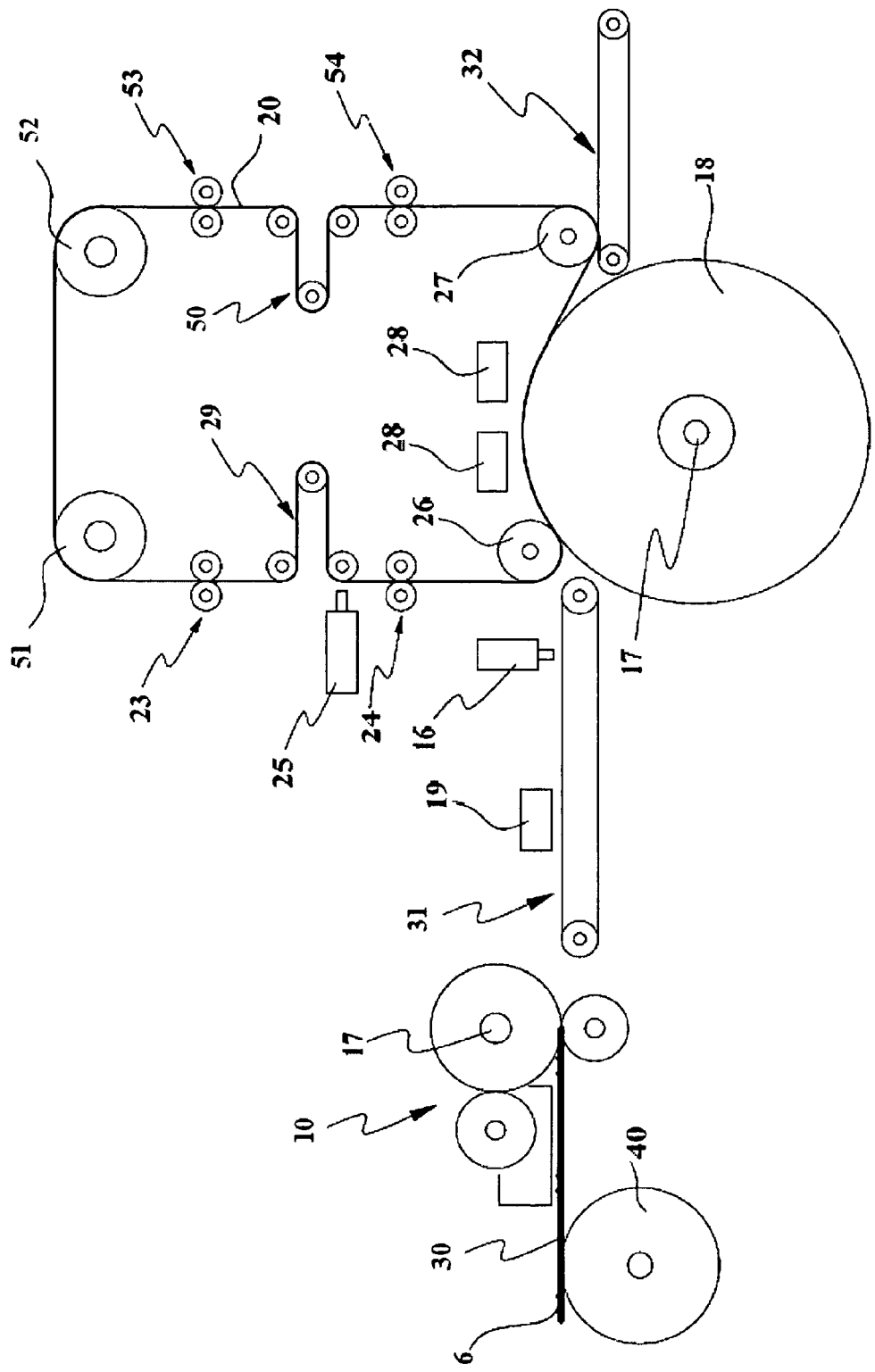
FIG. 6 is a diagrammatic representation of a system in accordance with an exemplary embodiment of the present invention in which registration between printed images on a sheet fed flexible substrate and impressed holographic and other microstructure or refractive images also on the flexible substrate is achieved by means of a continuous loop master web used in lieu of the master web shown in FIG. 4.

FIG. 6 another embodiment using a master web 20 in a continuous belt form for transferring holographic and other microstructure or refractive images onto a sheet-carried energy curable coating in registration with printing on the flexible substrate.

Figures 7A, 7B:
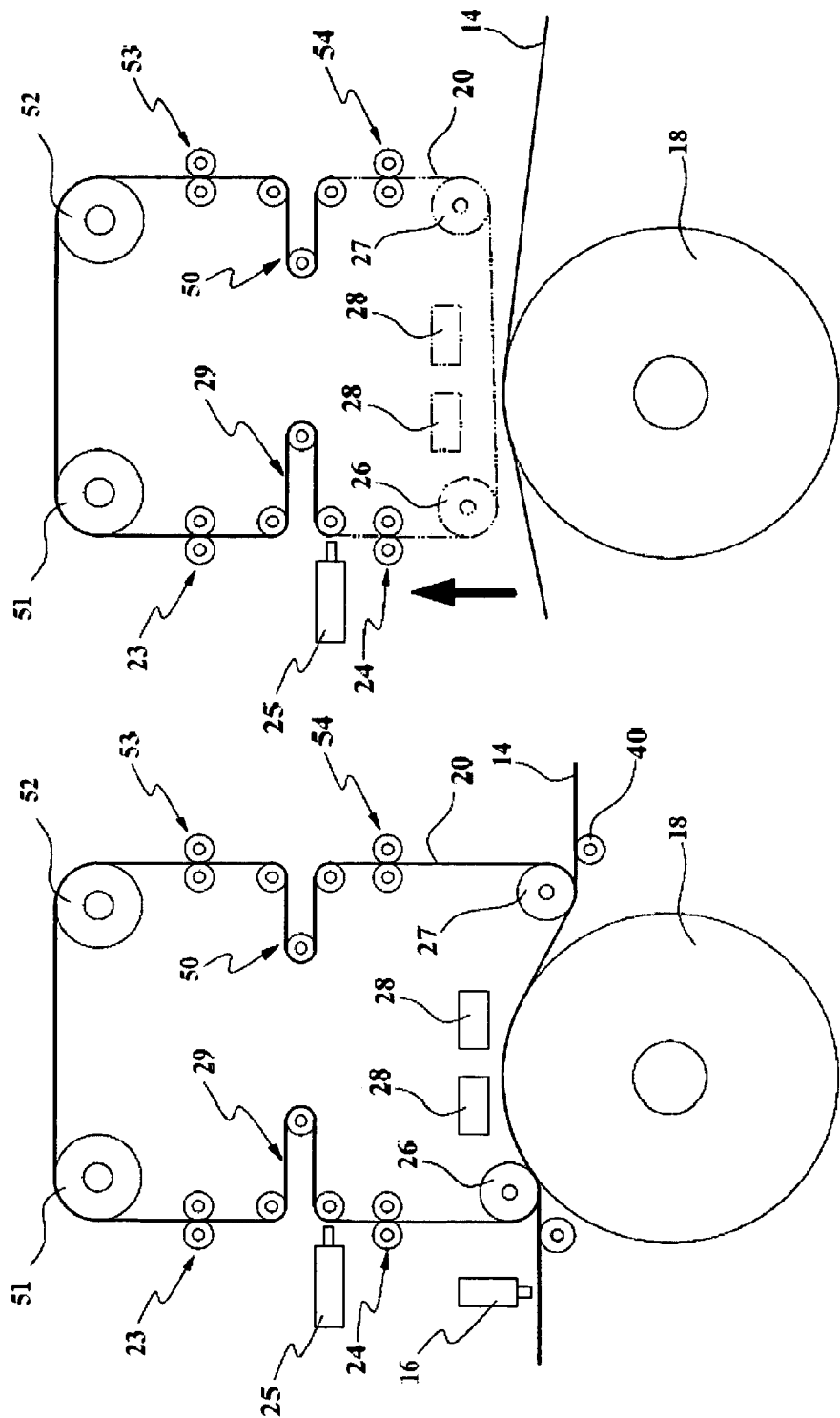
FIG. 7a is a diagrammatic representation of a system in accordance with an exemplary embodiment of the present invention in which a sub-side frame is installed and can be lifted for minimizing the waste on the master web and product itself, where the master web is in contact with the flexible substrate.
FIG. 7b is a diagrammatic representation of the system of FIG. 7a where the sub-side frame is in the lifted position.

FIGS. 7a and 7b illustrate an alternative embodiment of the invention utilizing a sub-side frame. An infeed nip roller 26, an outfeed stripping roller 27, and energy cure unit(s) 28 can be lifted to take the master web 20 off impression to minimize production changeover time. FIG. 7a is a diagrammatic representation of the invention where the master web 20 is in contact with the flexible substrate. FIG. 7b depicts the master web 20 off impression; that is, out of contact with the flexible substrate.

FIGS. 8a and 8b illustrate an alternative embodiment of the invention utilizing a moving impression roller 18. An impression roller 18 can be raised or lowered to place the master web 20 on or off impression to minimize production changeover time. FIG. 8a is a diagrammatic representation of the invention where the master web 20 is in contact with the flexible substrate. FIG. 8b depicts the master web 20 off impression; that is, out of contact with the flexible substrate.

Figure 9A:
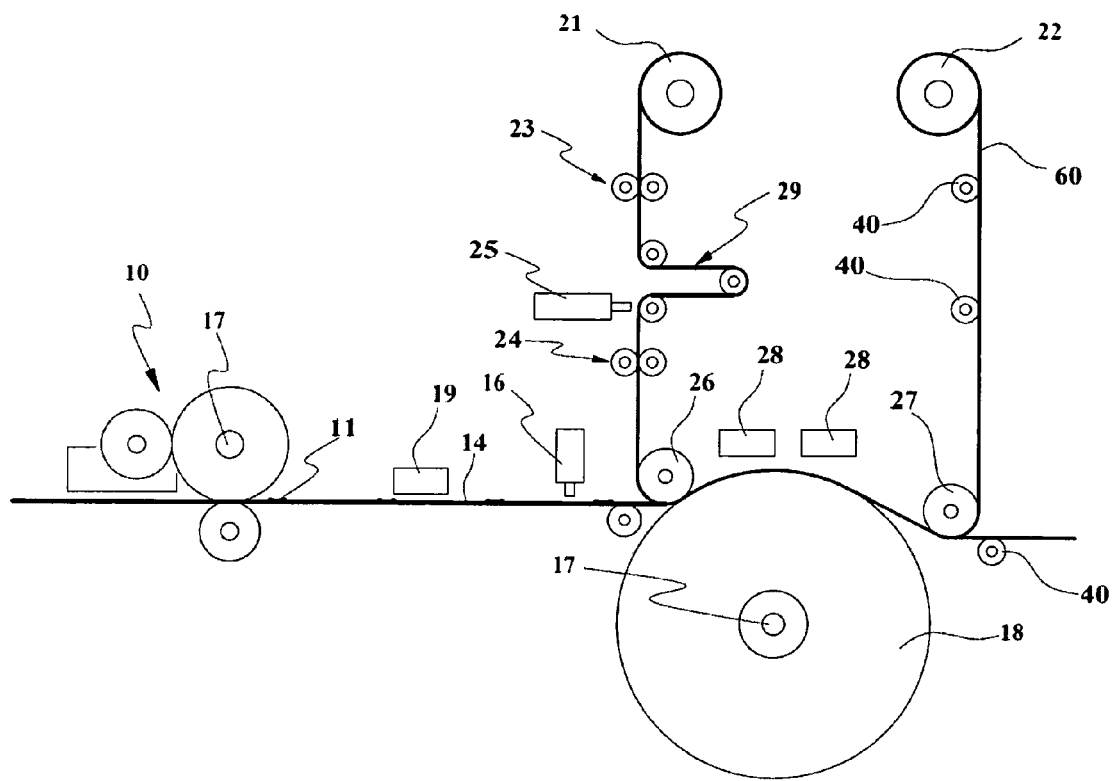
FIG. 9a is a diagrammatic representation of a system in accordance with an exemplary embodiment of the present invention in which wet or dry lamination cold foiling is achieved.
Figure 9B:
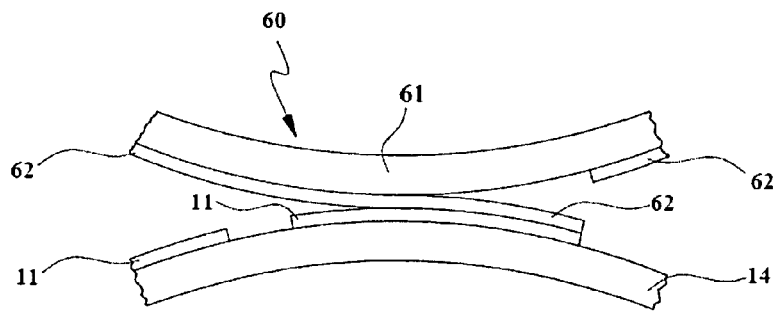

FIG. 9a illustrates another embodiment, where the master web comprises a cold foil film 60. A coater 10 applies an energy-curable coating to the flexible substrate either uniformly or in selected spots. Energy cure unit(s) 28 transmit UV curing energy through the cold foil master web to cure a high adhesion energy curable coating such as Cork Industries' CU-1137HG-21VS. As depicted in FIG. 9b, the high adhesion energy curable coating 11 strips metal 62 from the cold foil master web 60 in a wet lamination process known to the art. In another embodiment, an auxiliary energy cure unit 19 is added between the coater 10 and the master web infeed nip 26. The coater 10 applies an energy curable pressure sensitive coating 11 to the flexible substrate either uniformly or in selected spots, the auxiliary energy cure unit 19 activates the coating, the substrate is nipped to the cold foil master web 60, and the pressure sensitive energy curable coating 11 strips metal 62 from the cold foil master web 60 in a dry lamination process known to the art. Afterwards, the master web is separated from the flexible substrate to leave a reflective metal image on the flexible substrate.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method of preparing a flexible substrate, comprising the steps of:
    applying, using a substrate line unit, a spot or full-flood energy curable coating onto a surface of a flexible substrate with regularly-spaced registration marks as it advances at a substrate line speed, said substrate line unit comprising a coating station for applying said energy curable coating onto said surface, and a substrate register control scanner for detecting passing flexible substrate registration marks;
    advancing said coated flexible substrate to an energy curing unit comprising an impression cylinder, an infeed nip roller, and one or more energy sources;
    advancing, using a master web unit, a master web with one or more impressing images at a repeat distance and corresponding regularly-spaced registration marks, said master web unit comprising a master web tension nip operating at a controllable variable speed, a master web speed nip adapted to advance the master web to the energy curing unit at a speed equal to the flexible substrate line speed, and a master web register scanner for detecting passing master web registration parts, wherein said master web registered scanner is positioned between the master web tension nip and the master web speed nip;
    adjusting the master web tension nip speed to produce a degree of stretch in the master web so that the master web registration marks and flexible substrate registration marks are properly spaced and aligned as the master web and flexible substrate enter the energy curing unit;
    nipping or laminating the stretched master web to the flexible substrate by passing both over or through the infeed nip roller;
    jointly passing the stretched master web and flexible substrate over the surface of a portion of the impression cylinder; and
    applying curing energy from said one or more energy sources while jointly passing the stretched master web and flexible substrate over the surface of a portion of the impression cylinder, so as to leave an impressed image of the impressing image from the master web on the flexible substrate.

2. The method of claim 1, further wherein the master web unit comprises a master web compensator.

3. The method of claim 1, further wherein the energy curing unit comprises an outfeed stripping roller.

4. The method of claim 1, further comprising the step of adjusting the master web tension nip speed on-the-fly based upon the relative times respective registration marks are detected by the master web register scanner and the flexible substrate register control scanner.

5. The method of claim 1, further comprising the step of adjusting the master web tension nip speed so that the registration marks on the master web and the registration marks on the flexible substrate arrive simultaneously at the respective scanners.

6. The method of claim 1, further comprising the steps of supplying the master web from a master web unwind roll, and receiving on a master web rewind roll the master web after it has passed through the energy curing unit.

7. The method of claim 1, wherein the flexible substrate is chosen from the group consisting of heat shrinkable film, polyethylene terephthalate, polypropylene, oriented polypropylene, polyvinyl chloride, polystyrene, amorphous polyethylene terephthalate, polyethylene, paper, metal foil, and coiled metal.

8. The method of claim 1, wherein the flexible substrate is a heat shrinkable film.

9. The method of claim 8, wherein the heat shrinkable film is chosen from the group consisting of oriented polystyrene, glycol-modified polyethylene terephthalate, and polyvinyl chloride.

10. The method of claim 1, wherein the impressing image is chosen from the group consisting of holographic, varying texture images, stereogram, light-diffracting devices, optical lenses, and lenticular surfaces.

11. The method of claim 1, wherein the impressing image is a holographic image.

12. The method of claim 1, wherein the energy curable coating is spot coated onto the flexible substrate to receive the impressed images.

13. The method of claim 1, wherein the energy curable coating on the flexible substrate is curable with actinic radiation and the master web is transparent or translucent to permit the actinic radiation to pass through to cure the energy curable coating.

14. The method of claim 1, wherein printing is applied to the flexible substrate before the energy curable coating is applied.

15. The method of claim 1, wherein printing is applied over the coating after it is cured.

16. The method of claim 1, further comprising the step of placing a removable coating over the cured coating to hide the impressed images.

17. The method of claim 1, wherein the master web is a continuous loop.

* * * * *